(12) United States Patent
Gans

(10) Patent No.: US 8,075,060 B2
(45) Date of Patent: Dec. 13, 2011

(54) SLEEVE FOR A HEADREST

(75) Inventor: Matthias Gans, Aub (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 122 days.

(21) Appl. No.: 12/601,282

(22) PCT Filed: May 9, 2008

(86) PCT No.: PCT/IB2008/001158
§ 371 (c)(1),
(2), (4) Date: Nov. 23, 2009

(87) PCT Pub. No.: WO2008/142501
PCT Pub. Date: Nov. 27, 2008

(65) Prior Publication Data
US 2010/0194167 A1  Aug. 5, 2010

(30) Foreign Application Priority Data
May 23, 2007  (DE) .......................... 10 2007 023 996

(51) Int. Cl.
*A47C 7/36* (2006.01)
(52) U.S. Cl. ........................................................ 297/410
(58) Field of Classification Search .................. 297/410, 297/463.1
See application file for complete search history.

(56) References Cited

U.S. PATENT DOCUMENTS

| 4,411,470 A | 10/1983 | Nishimura et al. | |
| 4,589,698 A * | 5/1986 | Suzuki | 297/410 |
| 4,657,425 A | 4/1987 | Takahashi | |
| 5,529,379 A * | 6/1996 | Stocker | 297/410 |
| 7,108,327 B2 * | 9/2006 | Locke et al. | 297/410 |
| 2005/0077772 A1 * | 4/2005 | Yamada | 297/410 |

FOREIGN PATENT DOCUMENTS
FR  2578299 A1  9/1986
GB  2064312 A  6/1981

OTHER PUBLICATIONS
ISR and WO for PCT/IB2008/001158 dated Apr. 9, 2008.

* cited by examiner

*Primary Examiner* — Milton Nelson, Jr.
(74) *Attorney, Agent, or Firm* — Lowe Hauptman Ham & Berner LLP

(57) ABSTRACT

A plastic headrest sleeve receiving a headrest rod and comprising a tube fitted at its top end with a flange within which a slider is displaceably supported between a locked position, wherein it locks the headrest rod, and a release position, the wall of the said tube being fitted between its ends with at least one resilient clamping segment, a spring being mounted on the tube outside and biasing the resilient segment toward the tube inside, and a drive element displaceably resting on the tube, said drive element being operationally connected to the slider and the clamping segment in a manner that the spring's action on the clamping segment shall be reduced or eliminated when the slider is displaced into the release position.

9 Claims, 2 Drawing Sheets

Figure 1:
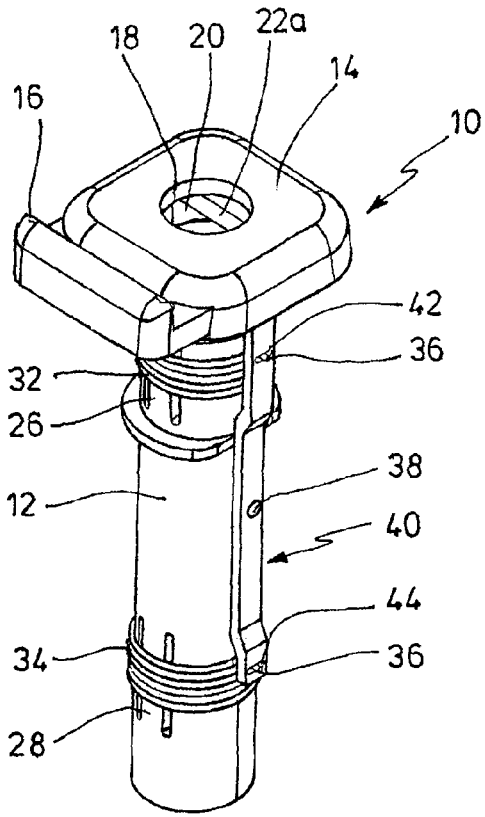

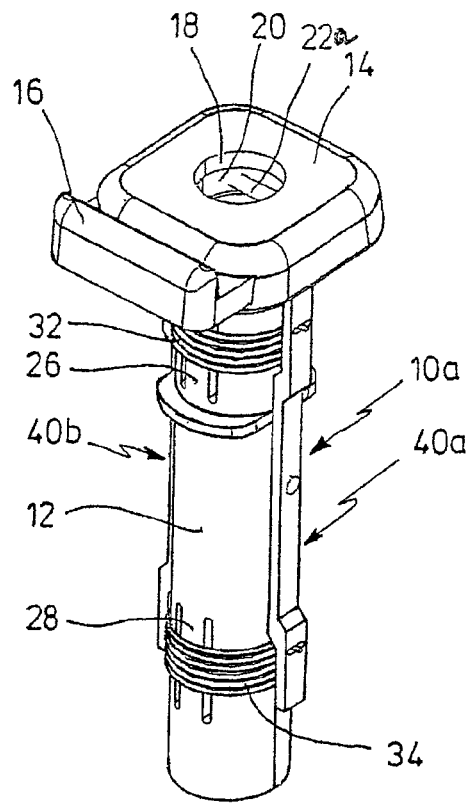
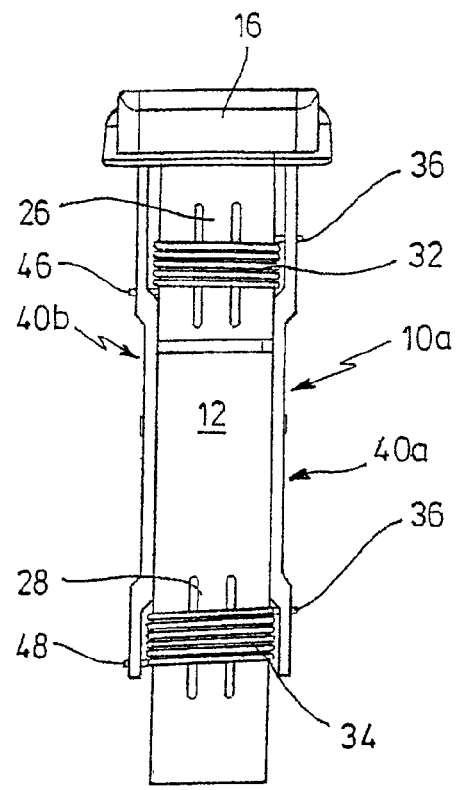
FIG.4        FIG.5
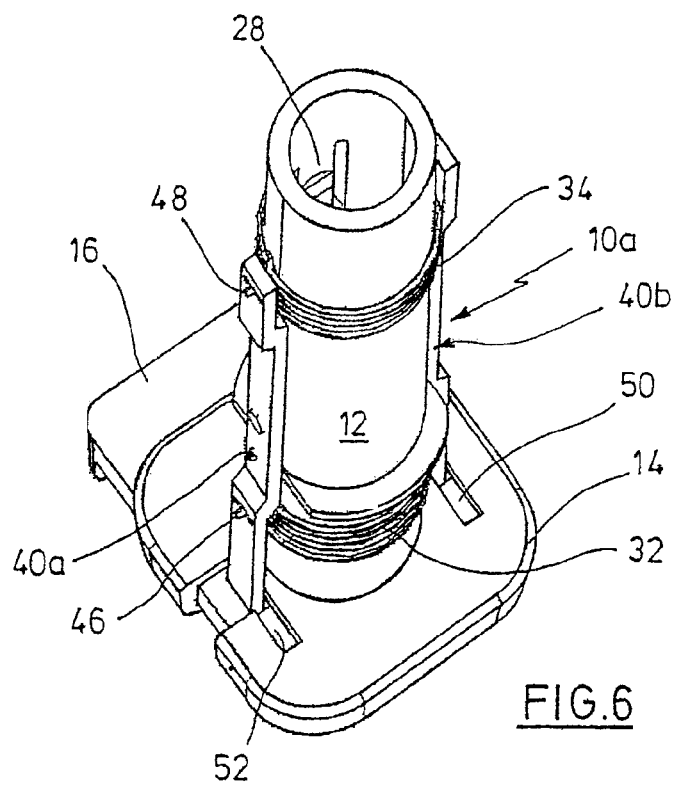
FIG.6

SLEEVE FOR A HEADREST

RELATED APPLICATIONS

The present application is national phase of PCT/IB2008/001158 filed May 9, 2008, and claims priority from German Application Number 10 2007 023 996.5 filed May 23, 2007, the disclosures of which are hereby incorporated by reference herein in their entirety.

The present invention relates to a plastic headrest sleeve.

Headrest sleeves are conventionally used for automobile seat backs. They receive the headrest rods that telescope more or less deeply into the head rest sleeve. Known headrest sleeves comprise a region flaring at its upper end to receive a slider cooperating by means of a locking element with recesses or notches in a headrest rod. In this manner the head rest may be locked in position at different heights. When the height must be changed, the slider element is actuated manually to open the lock. Thereupon the headrest can be adjusted to the new height.

It is known to mount slide rings within the headrest sleeve to attain improved guidance of the headrest rods. As a result the force required to adjust the headrest is also increased because said slide rings cause clamping. On the other hand, when driving, some clamping is necessary to preclude noise otherwise due to the clatter of the headrest rods within the guide sleeve.

So-called crash-actuated headrest sleeves have been introduced, which move toward a seated person in the event of an accident. These crash-actuated headrests shorten the path between said person's head and the site where it meets the headrest. Such crash-actuated headrest sleeves inherently are heavier than conventional ones. Most conventional headrest sleeves are unable to durably keep in place such heavy headrests.

The objective of the present invention is to create a headrest sleeve which offers on one hand adequately noiseless clamping of the headrest rods and on the other requires only comparatively low adjustment forces.

In the headrest sleeve of the present invention, the wall of the hollow tube headrest tube comprises at least one resilient clamping segment between its ends. At least one spring is mounted outside the tube and biases the resilient tube segment into the tube inside. A drive element rests in displaceable manner on the tube and cooperates in such manner on one hand with the slider and on the other hand with the clamping segment that the spring's action on the clamping segment is reduced or eliminated when the slider is moved into the release position.

The clamping element preferably is an integral part of the sleeve and is designed in a way that it shall engage in clamping manner, when being prestressed by the spring, a headrest rod within the sleeve. In one embodiment mode of the present invention, the resilient portion may be constituted for instance of two mutually parallel slots in the wall of the sleeve. The clamping segment may be fitted with a protrusion or boss entering the headrest sleeve. The clamping segment will not hamper displacing the headrest rod within the headrest sleeve provided it be free from the spring's bias. When a bias in applied to it, however, the clamping segment engages the headrest rod in clamping manner and therefore precludes undesired rod displacement within the sleeve and hence rattling. By using the slider to actuate the drive element, the spring bias is reduced or even eliminated and thereby the headrest rod is easily displaced. Releasing the spring bias and unlocking the headrest rod occur simultaneously by operating the drive element.

The design of the present invention preferably comprises two clamping segments mutually spaced apart as seen in the longitudinal direction of the sleeve, for instance being an upper and a lower clamping segment. The invention also provides two corresponding springs to bias the clamping segments.

Even comparatively heavy headrests may be mounted without generating noise into the headrest sleeve of the present invention, without requiring a high headrest adjusting force. The headrest of the invention may be galvanized, chromed, greased or coated in another way as desired.

In one embodiment mode of the present invention, the spring is a helical spring biasing the clamping segment into the tube inside, one end of the helical spring being affixed to the tube and the other end being connected to the drive element. In the inactive state, the helical spring encloses by one or more turns the tube in the zone of the clamping segment in order to bias it into the sleeve's inside. By displacing one spring end opposite the spring winding direction, the helical spring may be radially widened and thereby its bias may be reduced or eliminated.

In another embodiment mode of the present invention, the drive element may be in the form of a lever pivotably resting on the outside of the sleeve. Both the lever and the drive element are operationally linked to the slider, whereas another lever zone is connected to the spring, preferably one end of the helical spring.

Preferably said lever shall be of two arms where two mutually axially spaced clamping segments and appropriate helical springs surrounding said portions are used. Each lever arm is operationally connected to one helical screw end, whereas the other helical screw end is affixed to the sleeve. It is understood that the winding directions of the two helical springs are opposite because the displacement directions of the lever arms also are opposite.

In another embodiment mode of the present invention, a two-arm lever preferably shall be mounted on each opposite side of the sleeve and each lever is in contact with a spring end. Each end of a helical spring is connected to a lever arm, so that, when both levers are actuated, the helical springs are made to spread radially apart from opposite ends. This design offers the advantage that the adjustment path required to widen a helical spring is less than when only one helical spring end is being widened.

Illustrative embodiment modes of the present invention are elucidated below in the appended drawings.

Figure 2:
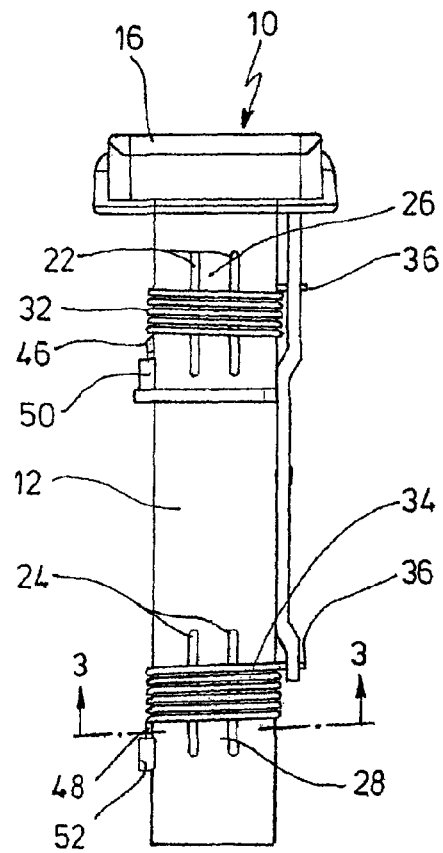
Figure 3:
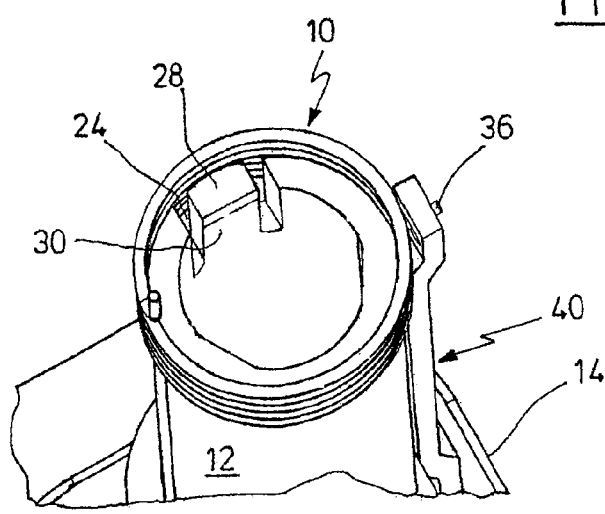

FIG. 1 is a perspective of a first embodiment mode of a headrest sleeve of the invention, FIG. 2 is the sideview of the headrest sleeve of FIG. 1, FIG. 3 shows the perspective of a section along line 3-3 of FIG. 1, FIG. 4 is a perspective of a second embodiment mode of a headrest sleeve of the invention, FIG. 5 is a sideview of the headrest sleeve of FIG. 4, and FIG. 6 is the perspective bottom view of the headrest sleeve of FIGS. 4 respectively 5.

A sleeve 10 is shown in FIGS. 1 through 3 and consists of a tube 12 and a rectangular flange zone 14 at the upper end of the tube 12. The tube 12 and flange 14 are made of plastic and are integral or in two parts. The flange 14 is fitted with a recess receiving a slider 16 and with a circular aperture 18 allowing inserting an omitted headrest rod. The slider 16 comprises a circular aperture 20 aligned with the aperture 18 and holding transversely through it, a wire 22a virtually subtending a chord in the circular aperture 20. This wire acts as a lock of the headrest rod which is fitted with a set of notches or the like. Ordinarily the slider 16 is biased into the position shown in FIG. 1 by an omitted spring, resulting in appropriately locking in place the headrest rod. If tube locking must be undone, a pressure is applied to the slider 16, thereby depressing the slider deeper into the flange 14. As a result the wire 22a is disengaged from the associated notch in the headrest rod 22a which then may be axially adjusted. This mechanism is widely known.

FIGS. 1 and 2 show that the tube 12 is fitted with two parallel slots 22, 24 in its upper and lower zones. The slots 22, 24 are made in the wall and in this manner constitute resilient clamping segments 26 and 28 respectively.

FIG. 3 shows the clamping segment 28 in section. The element 30 of the clamping segment 28 points inward and subtends a diameter relative to the axis of the tube 12 slightly less than that of the remaining inside wall of the tube 12.

Helical springs 32, 34 enclose the tube 12 in the zone of the clamping segments 26, 28. At the site denoted by 38, a two-arm lever 40 pivotably rests on the outer side between the clamping segments 26, 28. Said lever engages the inside of the flange 14 and is operationally connected to the sliders 16 (not shown in further detail). The lever 40 is crimped in the zone of the helical springs 32, 34 in a manner to be out contact with these springs 32, 34 when being pivoted. Pivoting is entailed by the displacement of the slider 16.

The helical springs 32, 34 each comprise a spring end 36 entering a slot 42 respectively 44 of the lever 40. The helical springs 32, 36 each comprise a further end 46, 48 affixed in a pad 50 respectively 52 at the outside of the tube 12. In the operating positions shown in FIGS. 1 through 3, the helical springs 32, 34 do bias the clamping segment 26 respectively 28 into the inside of the tube 12. This design allows clamping an omitted headrest rod in the tube 12. On the other hand, if the slider 12 is driven in the manner discussed above, the lever 40 of FIG. 1 is rotated clockwise, as a result of which the diameters of the two helical springs 32, 34 shall be enlarged. Consequently the bias on the clamping segments 26, 28 is reduced or eliminated, and the headrest rod can be adjusted without need for large adjustment forces.

A sleeve 10a is shown in FIGS. 4 through 6. The same reference numerals as above are used for the embodiment mode of FIGS. 4 through 6 to the extent the latter embodiment mode coincides with the former. The difference of the embodiment mode of FIGS. 4 through 6 relative to that of FIGS. 1 through 3 is that double-arm levers 40a 40b rest pivotably on the outside of the tube 12 on opposite sides of this tube. The ends 36, 46 of the upper helical spring 32 each are connected to the upper arm of the levers 40a, 40b by passing through appropriate slits. The lower spring ends 36, 48 are linked to the lower arm of the levers 40a, 40b. When the sliders 16 are actuated and thereby the levers 40a, 40b are pivoted, the corresponding spring ends are displaced in opposite directions, as a result of which the springs 32, 34 are widened twice as much as are those of FIGS. 1 through 3. The path of adjustment required to eliminate the spring bias on the clamping segments 26, 28 is reduced thereby.

FIG. 6 shows that the underside of the flange 14 is fitted with recesses 50, 52 receiving the upper zones of the levers 40a, 40b as far as into recesses of the slider 16 to allow pivoting the levers as described above when the slider 16 is actuated.

The invention claimed is:

1. A plastic headrest sleeve for receiving a headrest rod, said headrest sleeve comprising:
a tube having top and bottom ends, wherein a wall of the tube comprises at least one resilient clamping segment between the top and bottom ends;
a flange at the top end of the tube;
a slider that is supported by the flange and displaceable between a position locking the headrest rod and a release position,
a drive element; and
a helical spring that is mounted on an outside of the tube and automatically biases the resilient clamping segment into an inside of the tube, one end of the helical spring being connected to the drive element and the other end of the helical spring being affixed to the tube;
wherein the drive element is displaceably supported on the tube and is operationally connected to the slider and the resilient clamping segment in such a manner that spring action of the helical spring on the resilient clamping segment is reduced or eliminated when the slider is displaced into the release position.

2. Headrest sleeve as claimed in claim 1, comprising two resilient clamping segments which are axially apart along the tube and are each biased by a helical spring,
wherein said drive element comprises two circumferentially apart drive levers resting pivotably on the tube, one end of each of the helical springs engaging one lever arm of one of the two levers.

3. Headrest sleeve as claimed in claim 1, wherein the resilient clamping segment comprises a boss for engaging the headrest rod.

4. Headrest sleeve as claimed in claim 1, wherein the resilient clamping segment is constituted by a section of the wall of the tube between two mutually spaced-apart, parallel slots in the wall of the tube.

5. Headrest sleeve as claimed in claim 1, wherein the drive element is a lever pivotably resting on the outside of the tube.

6. Headrest sleeve as claimed in claim 5, comprising two resilient clamping segments which are axially apart along the tube and are each biased by a helical spring,
wherein the pivot axis of the lever is situated between the resilient clamping segments, and the directions of winding of the helical springs are mutually opposite to each other.

7. Headrest sleeve as claimed in claim 6, wherein
said drive element comprises two drive levers resting pivotably on the tube; and
each of the drive levers has one lever arm engaged with one end of one of the helical springs and another lever arm engaged with one end of the other helical spring.

8. A plastic headrest sleeve for receiving a headrest rod, said headrest sleeve comprising:
a tube having top and bottom ends, wherein a wall of the tube comprises at least one resilient clamping segment between the top and bottom ends, and wherein the resilient clamping segment is constituted by a section of the wall between two mutually spaced-apart, parallel slots in the wall of the tube;
a flange at the top end of the tube;
a slider supported by the flange and displaceable between a position locking the headrest rod and a release position;
a drive element; and
a spring mounted on an outside of the tube and biasing the resilient clamping segment into an inside of the tube;
wherein the drive element is displaceably supported on the tube and is operationally connected to the slider and the resilient clamping segment in such a manner that spring action of the spring on the resilient clamping segment is reduced or eliminated when the slider is displaced into the release position.

9. A plastic headrest sleeve for receiving a headrest rod, said headrest sleeve comprising:
- a tube having top and bottom ends, wherein a wall of the tube comprises at least one resilient clamping segment between the top and bottom ends;
- a flange at the top end of the tube;
- a slider supported by the flange and displaceable between a position locking the headrest rod and a release position;
- a drive element; and
- a spring mounted on an outside of the tube and biasing the resilient clamping segment into an inside of the tube;

wherein
- the resilient clamping segment comprises, on the inside of the tube, a boss for engaging the headrest rod; and
- the drive element is displaceably supported on the tube and is operationally connected to the slider and the resilient clamping segment in such a manner that spring action of the spring on the resilient clamping segment is reduced or eliminated when the slider is displaced into the release position.

* * * * *